(12) United States Patent
Spronk

(10) Patent No.: US 8,469,429 B1
(45) Date of Patent: Jun. 25, 2013

(54) TRAILER HITCH COUPLER STORAGE ASSEMBLY AND SYSTEM

(76) Inventor: Seth Spronk, Edgerton, MN (US)

( * ) Notice: Subject to any disclaimer, the term of this patent is extended or adjusted under 35 U.S.C. 154(b) by 0 days.

(21) Appl. No.: 13/292,726

(22) Filed: Nov. 9, 2011

(51) Int. Cl.
*B60R 7/00* (2006.01)

(52) U.S. Cl.
USPC ........................................................ 296/37.1

(58) Field of Classification Search
USPC .................. 296/37.1, 37.6; 280/415.1, 416.1, 280/504, 769; 224/488, 511, 518, 519, 403, 224/404, 543
See application file for complete search history.

(56) References Cited

U.S. PATENT DOCUMENTS

| | | | |
|---|---|---|---|
| 4,204,702 A | 5/1980 | Oltrogge | |
| 5,106,114 A * | 4/1992 | Haupt | 280/416.1 |
| 5,158,316 A | 10/1992 | Hutchmacher | |
| 5,322,313 A | 6/1994 | Schroeder | |
| 6,481,604 B1 * | 11/2002 | Beene et al. | 224/404 |
| 6,511,090 B2 | 1/2003 | Quanbeck et al. | |
| 7,055,844 B1 | 6/2006 | Bostedt | |
| 7,204,505 B2 | 4/2007 | Moss | |
| 2003/0052472 A1 | 3/2003 | Moss et al. | |
| 2003/0057676 A1 | 3/2003 | Griggs et al. | |
| 2006/0087101 A1 * | 4/2006 | Yon | 280/504 |
| 2006/0201980 A1 * | 9/2006 | Koons | 224/511 |
| 2007/0221899 A1 * | 9/2007 | Braithwaite | 254/418 |
| 2008/0231029 A1 * | 9/2008 | Hummel | 280/769 |
| 2010/0314899 A1 * | 12/2010 | Slacks | 296/37.6 |
| 2011/0156369 A1 * | 6/2011 | Schroder | 280/491.1 |

* cited by examiner

*Primary Examiner* — H Gutman

(57) ABSTRACT

A trailer hitch coupler storage assembly includes a receiver with a closed loop perimeter wall that includes a front wall, a rear wall, a first side wall and a second side wall coupled together in a generally rectangular configuration. The perimeter wall includes an upper edge and a lower edge. A plurality of dividing walls is attached to and extends between the front and rear walls to divide the receiver into a plurality of slots. The slots are each configured to receive a hitch coupler. A bracket is attached to the receiver and extends away from the receiver. The bracket is configured to be mounted to a wall of a vehicle.

14 Claims, 5 Drawing Sheets

TRAILER HITCH COUPLER STORAGE ASSEMBLY AND SYSTEM

BACKGROUND OF THE DISCLOSURE

Field of the Disclosure

The disclosure relates to hitch coupler storage devices and more particularly pertains to a new hitch coupler storage device for holding a plurality of various hitch couplers in a stored configuration on a vertical surface.

SUMMARY OF THE DISCLOSURE

An embodiment of the disclosure meets the needs presented above by generally comprising a receiver with a closed loop perimeter wall that includes a front wall, a rear wall, a first side wall and a second side wall coupled together in a generally rectangular configuration. The perimeter wall includes an upper edge and a lower edge. A plurality of dividing walls is attached to and extends between the front and rear walls to divide the receiver into a plurality of slots. The slots are each configured to receive a hitch coupler. A bracket is attached to the receiver and extends away from the receiver. The bracket is configured to be mounted to a wall of a vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
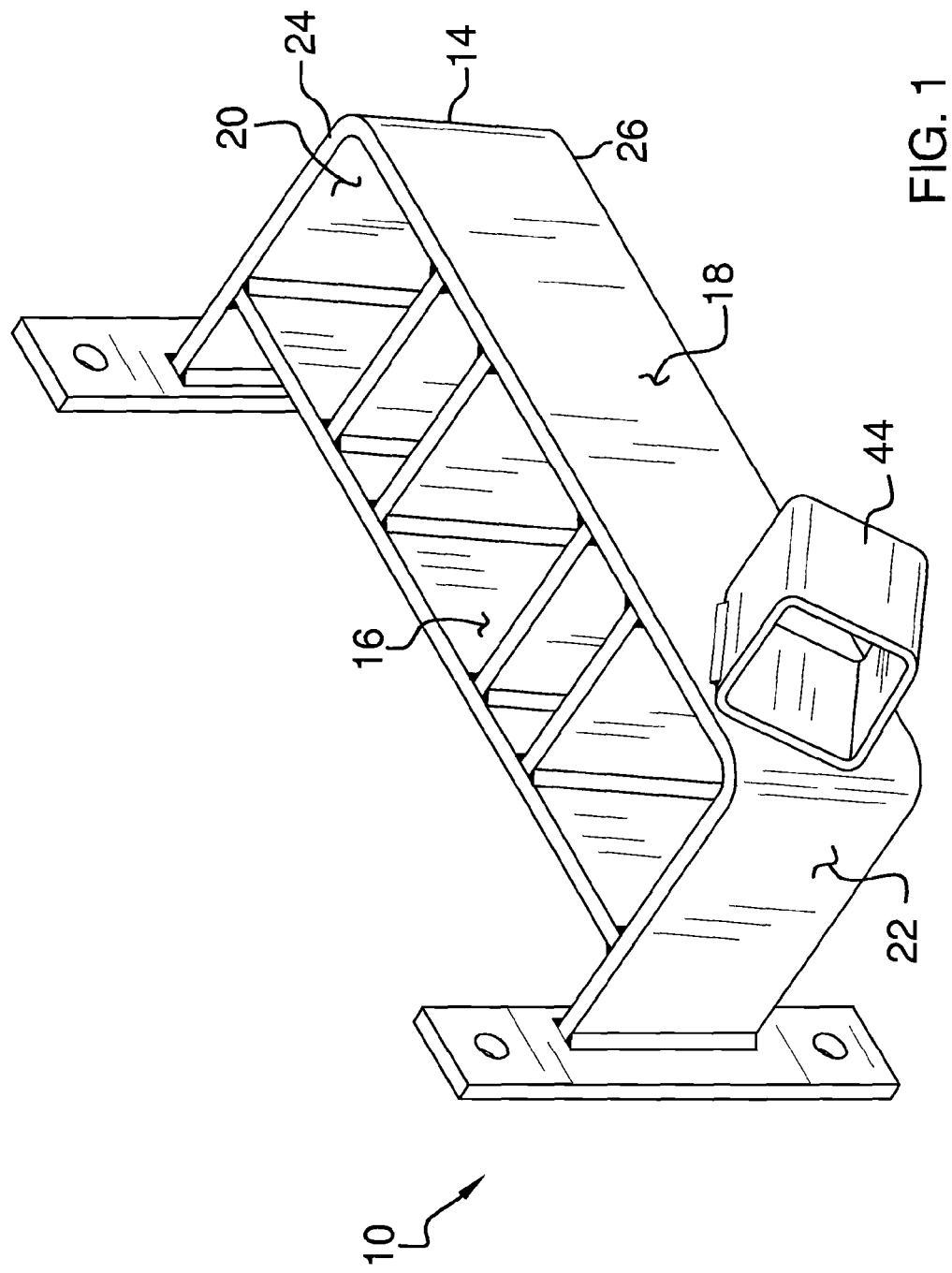
FIG. 1 is a front perspective view of a trailer hitch coupler storage assembly and system according to an embodiment of the disclosure.

With reference now to the drawings, and in particular to FIGS. 1 through 5 thereof, a new hitch coupler storage device embodying the principles and concepts of an embodiment of the disclosure and generally designated by the reference numeral 10 will be described.

As best illustrated in FIGS. 1 through 5, the trailer hitch coupler storage assembly 10 and system generally comprises a receiver 12 that includes a closed loop perimeter wall 14. The perimeter wall 14 includes a front wall 18, a rear wall 16, a first side wall 20 and a second side wall 22 coupled together in a generally rectangular configuration. The perimeter wall 14 includes an upper edge 24 and a lower edge 26. The perimeter wall 14 may have a height from said upper edge 24 to said lower edge 26 between 1.0 inch and 4.0 inches.

Figure 3:
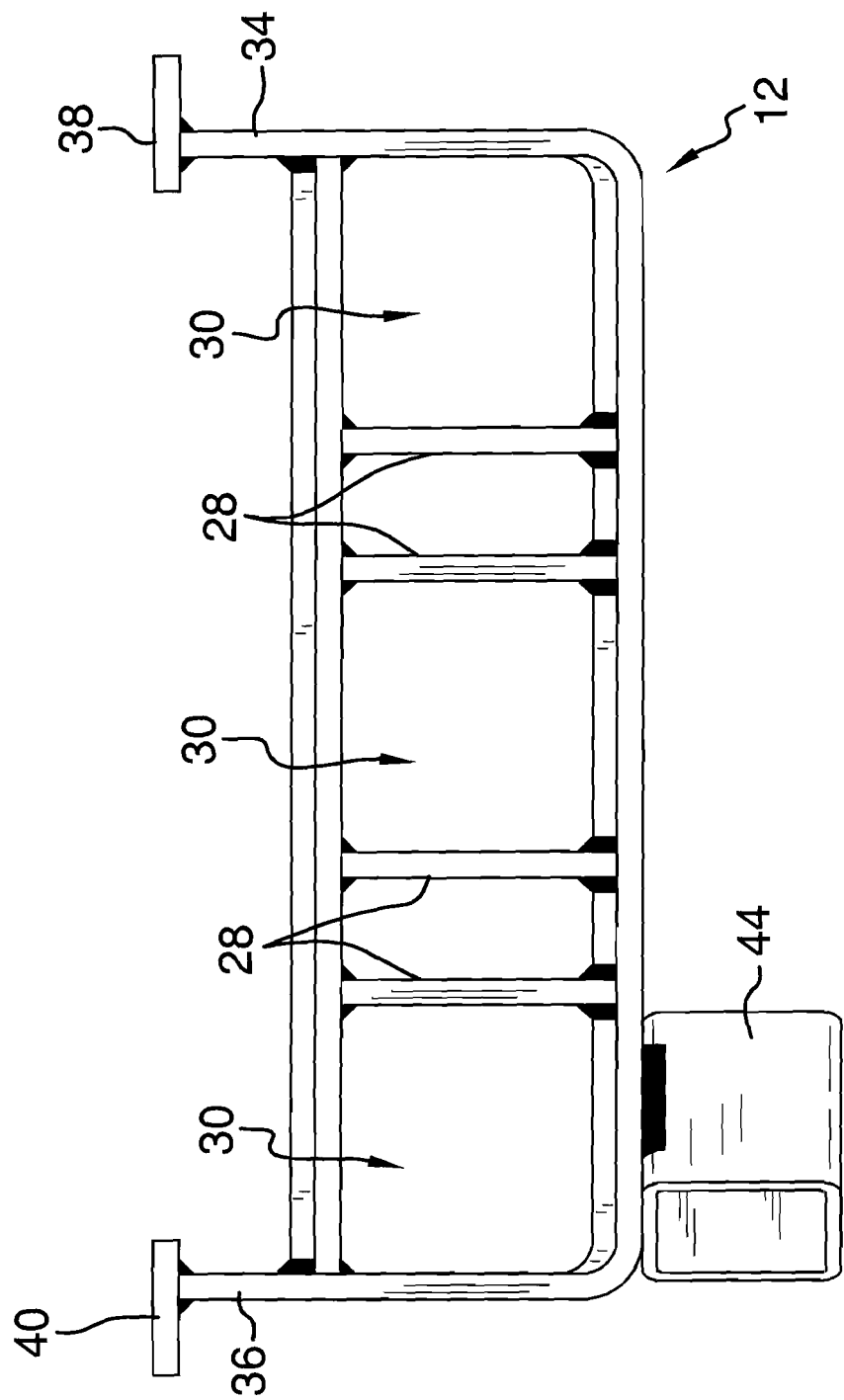
FIG. 3 is a top view of an embodiment of the disclosure.
Figure 4:
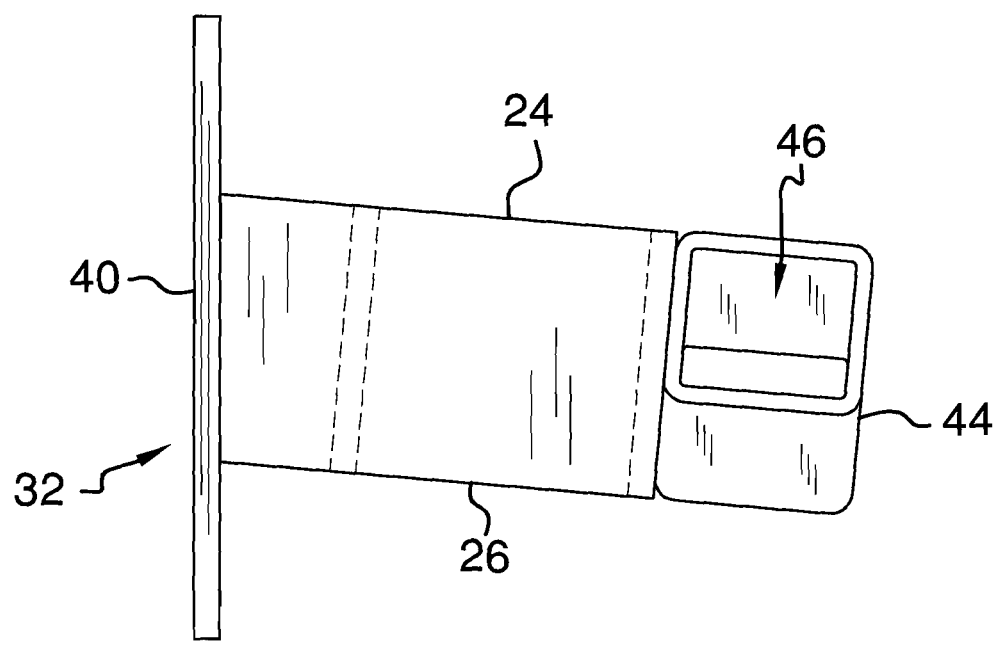
FIG. 4 is a side view of an embodiment of the disclosure.
Figure 5:
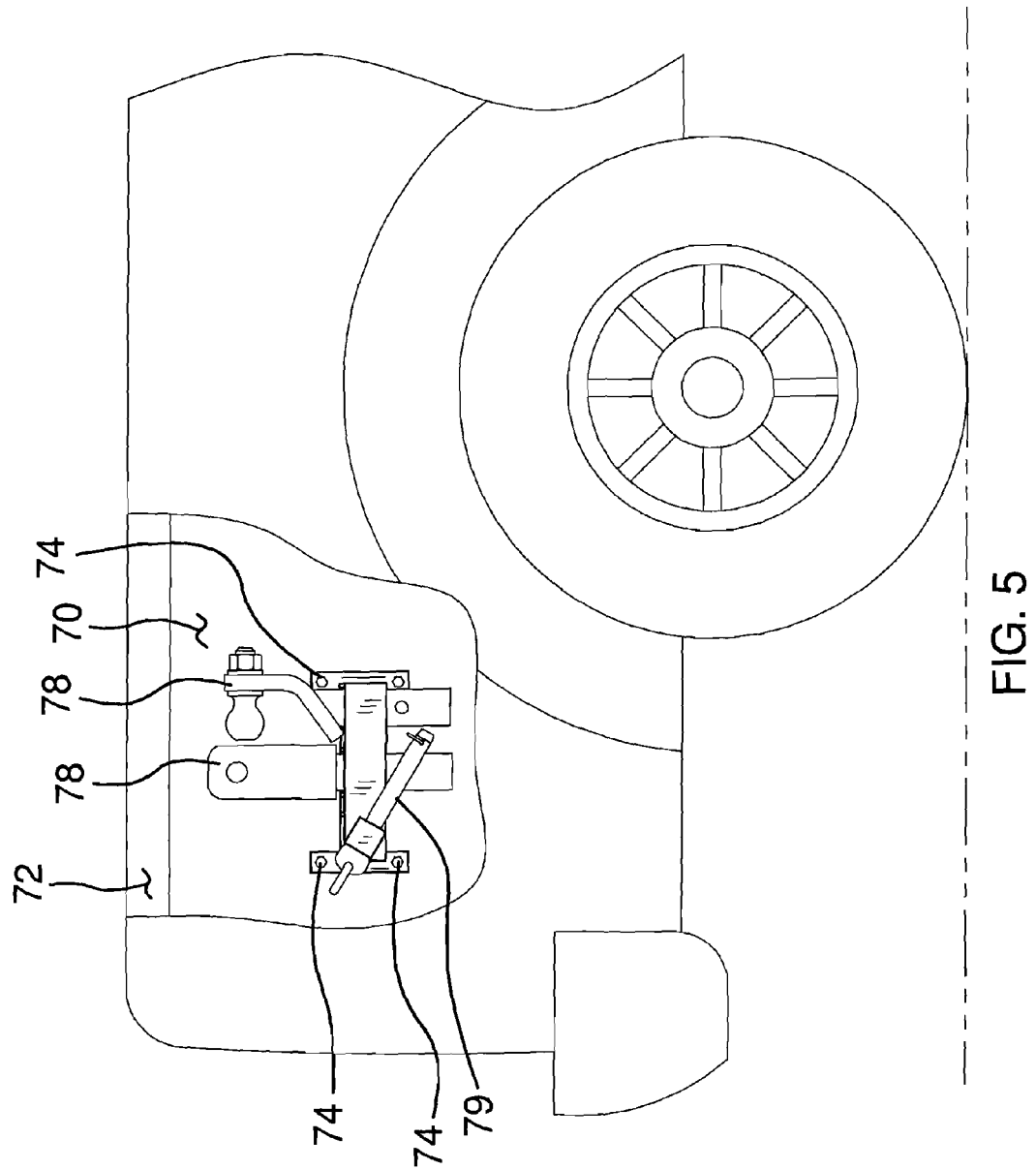
FIG. 5 is a front in-use view of an embodiment of the disclosure.

A plurality of dividing walls 28 is attached to and extends between the front 18 and rear 16 walls to divide the receiver 12 into a plurality of slots 30. Each of the slots 30 is configured to receive a hitch coupler 78 such as would be inserted into a hitch receiver on a vehicle. The slots 30 each have an internal length and a width between 1.5 inches and 2.5 inches. The slots 30 are spaced from each other a distance greater than 0.75 inches. This may be accomplished by the dividing walls 28 having a sufficient thickness, or, as shown in FIG. 3, each of the dividing walls 28 may include a pair of dividing walls spaced from each other. The plurality of slots 30 may include at least three slots.

A bracket 32 is attached to the receiver 12 and extends away from the receiver 12. The bracket 32 is angled with respect to the receiver 12 such that receiver 12 is angled downwardly when the bracket 32 is vertically orientated. The bracket 32 includes a first arm 34 that is attached to the rear wall 16 adjacent to the first end wall 20. A second arm 36 is attached to the rear wall 16 adjacent to the second end wall 22. The first 34 and second 36 arms extend away from the rear wall 16 a distance at least equal to 0.75 inches. This allows for raised sections of a truck bed wall 70 to be positioned between the first 34 and second 36 arms. A first plate 38 is attached to a distal end of the first arm 34 with respect to the rear wall 16. The first plate 38 lies in a plane forming an angle with the upper edge 24 between 92° and 100°. A second plate 40 is attached to a distal end of the second arm 36 with respect to the rear wall 16. The second plate 40 lies in a plane forming an angle with the upper edge 24 between 92° and 100°. This angle allows for the hitch couplers 78 to be easily inserted into the slots 30 while clearing an upper lip 72 of a truck bed wall 70. The first 38 and second 40 plates each have mount apertures 42 extending therethrough and each is configured to receive fasteners 74 extendable into a mounting wall. The mounting wall may typically include the wall 70 of a truck bed.

Figure 2:
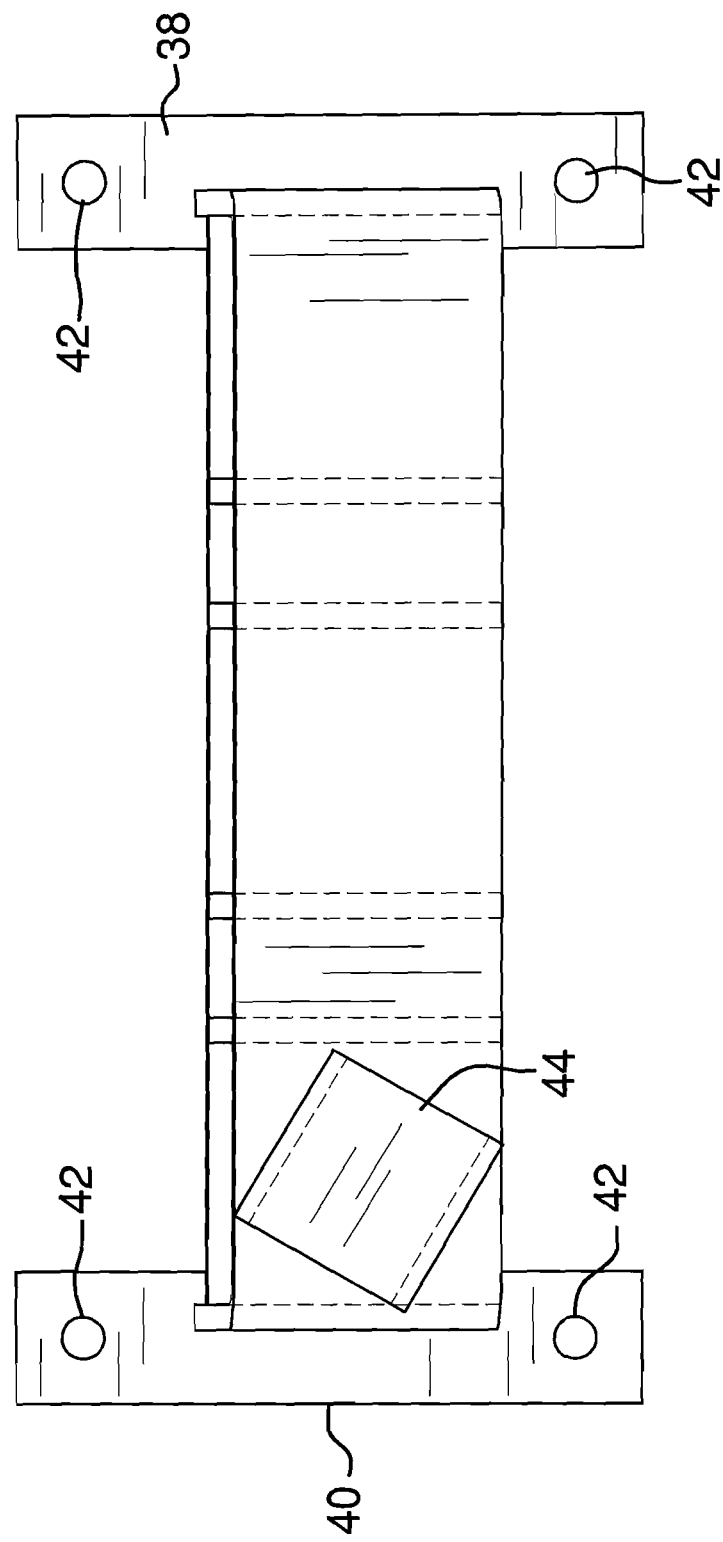
FIG. 2 is a front view of an embodiment of the disclosure.

A sleeve 44 is attached to the receiver 12 and is positioned on an outer surface of the front wall 18. The sleeve 44 has an opening 46 extending therethrough has an axis that lies in a plane oriented parallel to a plane of the front wall 18. However, as can be seen in FIG. 2, the sleeve 44 may be angled away from a vertical orientation. The opening 46 of the sleeve 44 has an internal length and width each being less than 1.0 inch. The opening 46 and the slots 30 may each have a generally square shape.

In use, the receiver 12 is attached to the inner surface of a vehicle wall, and in particular to the wall 70 of a truck bed, so that the slots 30 are positioned for receiving hitch couplers 78. The sleeve 44 may be used, as needed to retain hitch pin holders 79.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A hitch coupler storage assembly configured for being mounted on a wall of a vehicle, said assembly comprising:
   a receiver including a closed loop perimeter wall, said perimeter wall including a front wall, a rear wall, a first side wall and a second side wall coupled together in a generally rectangular configuration, said perimeter wall including an upper edge and a lower edge;
   a plurality of dividing walls being attached to and extending between said front and rear walls to divide said receiver into a plurality of slots, each of said slots being configured to receive a hitch coupler; and
   a bracket being attached to said receiver and extending away from said receiver, said bracket being configured to be mounted to a wall of a vehicle,
   wherein said bracket includes;
      a first arm being attached to said rear wall adjacent to said first end wall;
      a second arm being attached to said rear wall adjacent to said second end wall;
      a first plate being attached to a distal end of said first arm with respect to said rear wall;
      a second plate being attached to a distal end of said second arm with respect to said rear wall; and
      said first and second plates each having mount apertures extending therethrough configured to receive fasteners extendable into a mounting wall.

2. The assembly according to claim 1, wherein said slots each have an internal a length and a width between 1.5 inches and 2.5 inches.

3. The assembly according to claim 2, wherein said slots are spaced from each other a distance greater than 0.75 inches.

4. The assembly according to claim 2, wherein said plurality of slots includes three slots.

5. The assembly according to claim 1, wherein:
   said first plate lies in a plane forming an angle with said upper edge between 92° and 100°; and
   said second plate lies in a plane forming an angle with said upper edge between 92° and 100°.

6. The assembly according to claim 5, wherein said first and second arms extends away from said rear wall a distance at least equal to 0.75 inches.

7. The assembly according to claim 1, further including a sleeve being attached to said receiver, said sleeve being positioned on an outer surface of said front wall, said sleeve having an opening extending therethrough having an axis that lies in a plane oriented parallel to a plane of said front wall, said opening of said sleeve having an internal length and width each being less than 1.0 inch.

8. The assembly according to claim 1, wherein said slots each have an internal a length and a width between 1.5 inches and 2.5 inches.

9. The assembly according to claim 8, wherein said slots are spaced from each other a distance greater than 0.75 inches.

10. The assembly according to claim 8, wherein said plurality of slots includes three slots.

11. A hitch coupler storage assembly configured for being mounted on a wall of a vehicle, said assembly comprising:
   a receiver including a closed loop perimeter wall, said perimeter wall including a front wall, a rear wall, a first side wall and a second side wall coupled together in a generally rectangular configuration, said perimeter wall including an upper edge and a lower edge;
   a plurality of dividing walls being attached to and extending between said front and rear walls to divide said receiver into a plurality of slots, each of said slots being configured to receive a hitch coupler, said slots each having an internal length and a width between 1.5 inches and 2.5 inches, said slots being spaced from each other a distance greater than 0.75 inches, said plurality of slots including three slots;
   a bracket being attached to said receiver and extending away from said receiver, said bracket being angled with respect to said receiver such that receiver is angled downwardly when said bracket is vertically orientated, said bracket including;
      a first arm being attached to said rear wall adjacent to said first end wall;
      a second arm being attached to said rear wall adjacent to said second end wall, said first and second arms extending away from said rear wall a distance at least equal to 0.75 inches;
      a first plate being attached to a distal end of said first arm with respect to said rear wall, said first plate lying in a plane forming an angle with said upper edge between 92° and 100°;
      a second plate being attached to a distal end of said second arm with respect to said rear wall, said second plate lying in a plane forming an angle with said upper edge between 92° and 100°;
      said first and second plates each having mount apertures extending therethrough configured to receive fasteners extendable into a mounting wall; and
   a sleeve being attached to said receiver, said sleeve being positioned on an outer surface of said front wall, said sleeve having an opening extending therethrough having an axis that lies in a plane oriented parallel to a plane of said front wall, said opening of said sleeve having an internal length and width each being less than 1.0 inch.

12. A hitch coupler storage assembly configured for being mounted on a wall of a vehicle, said assembly comprising:
   a receiver including a closed loop perimeter wall, said perimeter wall including a front wall, a rear wall, a first side wall and a second side wall coupled together in a generally rectangular configuration, said perimeter wall including an upper edge and a lower edge;
   a plurality of dividing walls being attached to and extending between said front and rear walls to divide said receiver into a plurality of slots, each of said slots being configured to receive a hitch coupler;
   a bracket being attached to said receiver and extending away from said receiver, said bracket being configured to be mounted to a wall of a vehicle; and
   a sleeve being attached to said receiver, said sleeve being positioned on an outer surface of said front wall, said sleeve having an opening extending therethrough having an axis that lies in a plane oriented parallel to a plane of said front wall, said opening of said sleeve having an internal length and width each being less than 1.0 inch.

13. The assembly according to claim 12, wherein said bracket includes:
   a first arm being attached to said rear wall adjacent to said first end wall;
   a second arm being attached to said rear wall adjacent to said second end wall;

a first plate being attached to a distal end of said first arm with respect to said rear wall, said first plate lying in a plane forming an angle with said upper edge between 92° and 100°;

a second plate being attached to a distal end of said second arm with respect to said rear wall, said second plate lying in a plane forming an angle with said upper edge between 92° and 100°; and said first and second plates each having mount apertures extending therethrough configured to receive fasteners extendable into a mounting wall.

14. The assembly according to claim 13, wherein said first and second arms extends away from said rear wall a distance at least equal to 0.75 inches.

* * * * *